STEPHEN W. HOLLEN.

Improvement in Time Locks.

No. 121,782. Patented Dec. 12, 1871.

Witnesses.
Harry King
Phil. T. Dodge

Inventor.
Stephen W. Hollen
by Dodge & Munn
his attys 121,782

UNITED STATES PATENT OFFICE.

STEPHEN WILLIAM HOLLEN, OF CINCINNATI, OHIO.

IMPROVEMENT IN TIME-LOCKS.

Specification forming part of Letters Patent No. 121,782, dated December 12, 1871.

*To all whom it may concern:*

Be it known that I, STEPHEN WILLIAM HOLLEN, of Cincinnati, in the county of Hamilton and State of Ohio, have invented certain Improvements in Time-Locks, of which the following is a specification, reference being had to the accompanying drawing.

My invention relates to that class of locks which is provided with clock-work, by which they may be set so as to open at any particular time, and not before.

Figure 1:
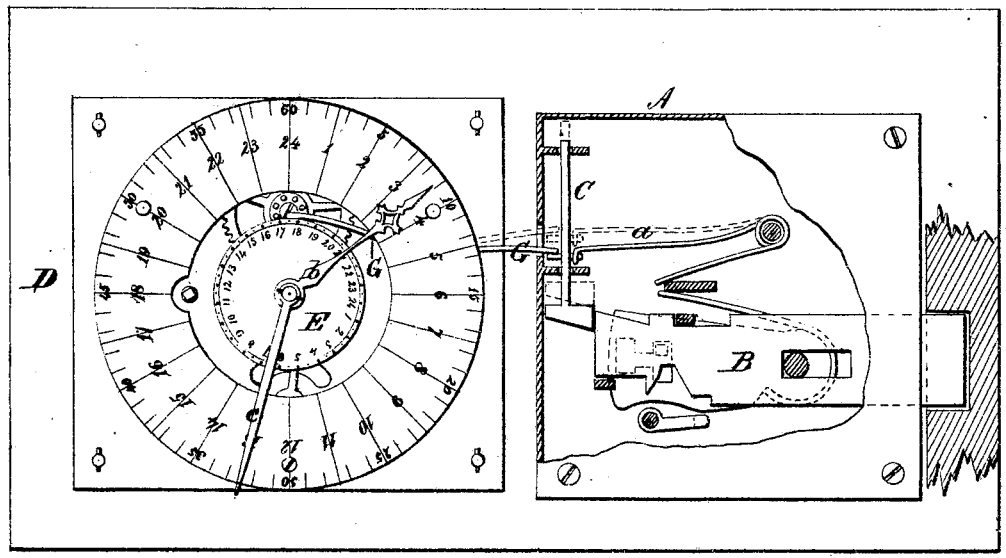
Figure 2:
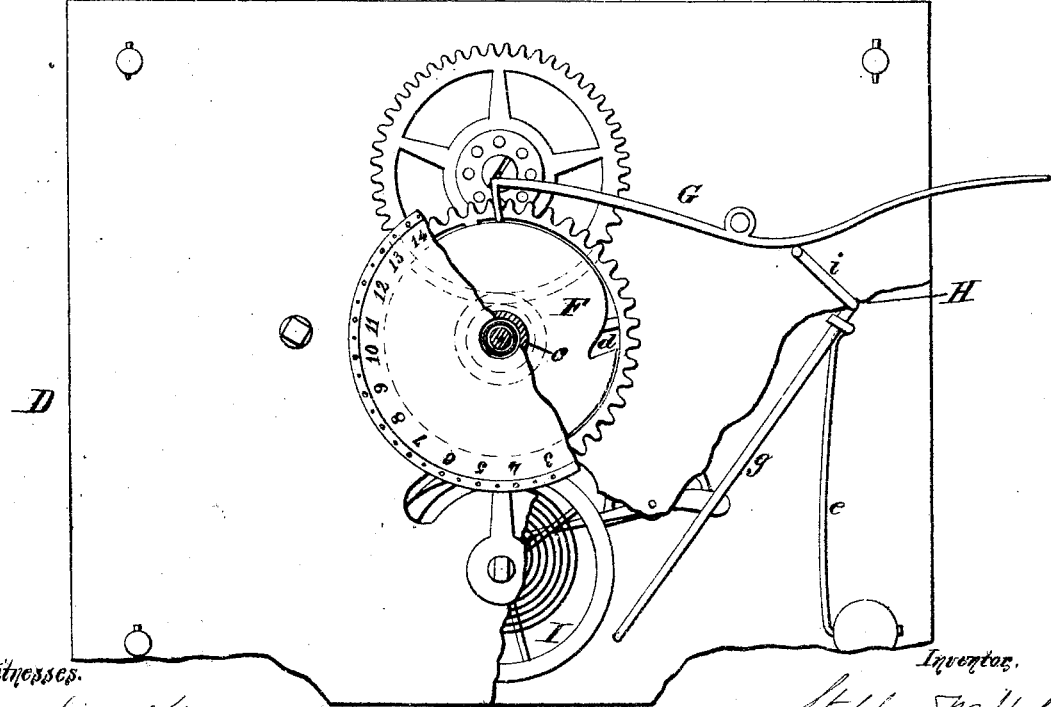

Figure 1 is a front elevation of my lock, portions being broken away to show the interior. Fig. 2 is a face view of the clock-work alone, portions being broken away to expose the interior.

In the drawing, A represents an ordinary key-lock, having a sliding locking bolt, B; and C is a vertical sliding dog or bar, mounted in the back end of the lock in such manner that when the bolt is out the dog can slide down behind it and prevent it from being drawn in or unlocked until the dog is raised. A spring, a, is connected with the dog, as shown in Fig. 1, so as to throw the same up, except when held down, and to prevent it from sliding down by its own weight. D represents a clock, secured in position behind the lock for the purpose of operating the dog C. This clock is constructed in an ordinary manner, except that the hour-hand is so arranged as to make one revolution in twenty-four hours instead of twelve, and that the dial is divided into twenty-four divisions to correspond. E is a small dial-plate, also having twenty-four divisions, which is mounted on the shaft or sleeve of the hour-hand; and F is a circular disk, mounted on the hour-hand shaft behind the small dial, and connected rigidly to the dial by a sleeve, C, so that they must both move together. The dial and disk are so mounted on the shaft that they can be turned around thereon, while at the same time there is sufficient friction to carry them with the shaft as it revolves. The disk is provided with a notch, d, in its edge, as shown in Fig. 2, and upon the top of the disk there bears one end of a lever, G, which falls into the notch d when the disk is turned so as to bring it thereunder. The lever G is pivoted at its middle, and has its forward end arranged to bear on a pin on the side of the sliding dog C of the lock, as shown in Fig. 1, so that when its end drops into the notch of the disk the opposite end rises and permits the dog C to slide up from behind the bolt, which can then be moved inward. But when the disk is turned so as to raise the lever out of the notch the other end of the lever slides the dog down behind the bolt and prevents the same from being drawn back. H represents a rock-shaft, provided with an arm, g, against which a spring, e, bears, and with a crank, i, which bears under the outer end of lever G, as shown in Fig. 2, so that when the end of the lever rises and the dog is lifted from behind the bolt B it allows the crank i to turn and the spring e to press the arm g against the balance-wheel of the clock and stop the same. But when the lever G falls to let the dog slide behind the bolt it also turns the crank i and lifts the arm g from the balance-wheel, so that the clock can operate and set the disk F in motion. The divisions on the clock-face and on the small dial are numbered from 1 to 24, successively, and the notch in the disk is located immediately behind the last or twenty-fourth space on the small dial. As the dial is turned on its shaft so as to bring its different numbers under the hour-hand, the notch is, of course, brought into different relative positions to said hand, being at one time under or in line with the hand and at another time on the opposite side of the shaft therefrom. The relative positions of the hand and notch are not, however, changed by the running of the clock, but only by taking hold of the disk and turning with the fingers.

In order to set the clock so as to raise the dog and permit the lock to be opened at any particular hour, it is only necessary to turn the small dial until the number indicating the required hour is brought under the hour-hand. For example, if it is required to have the lock open at 9 a. m. of the next day, the dial is turned until the number 21 is brought under the hand, as the required hour is the twenty-third one from noon of the previous day, which is indicated by the number 1 on the clock-face. As the hour-hand revolves the disk is carried around with it until the notch comes under the end of the lever, which it will do when the hand reaches the number 21 on the clock-face at 9 o'clock, at which time the lever will be allowed to move and the dog be raised and stop the clock, so that the lock may be operated. The lever G is made of steel or other flexible material, so that it can yield or bend when its end is raised by the disk, at a time when the bolt B is back so as to prevent the dog from descending, for in such case the dog will bear on top of the bolt and prevent the end of the lever from descending. To prevent the lever from being kept in its bent or curved form during the whole time that the bolt is back, by which the lever would be liable to become permanently bent or set, the lower end of the dog is beveled and the bolt is provided with a notch or recess to receive the same, the dog being thus allowed to descend almost as far as when it locks behind the bolt. When the bolt moves forward the dog rises out of the notch and drops down behind the bolt.

Having thus described my invention, what I claim is—

1. The combination of the lock A and clock D with the disk F, provided with notch $d$, lever G, dog C, and spring $a$, when constructed and arranged substantially as and for the purpose set forth.

2. In combination with the above, the rock-shaft H and spring $e$, when constructed and arranged substantially as and for the purpose set forth.

STEPHEN W. HOLLEN.

Witnesses:
J. McKenney,
Phil. T. Dodge. (93)